United States Patent [19]

Kiuchi et al.

[11] 4,211,912
[45] Jul. 8, 1980

[54] INDUCTION HEATING APPARATUS

[75] Inventors: Mitsuyuki Kiuchi; Shigeo Hamaoka, both of Kadoma, Japan

[73] Assignee: Matsushita Electric Industrial Co., Ltd., Osaka, Japan

[21] Appl. No.: 927,649

[22] Filed: Jul. 24, 1978

[30] Foreign Application Priority Data

Jul. 27, 1977 [JP] Japan ................................ 52/90723

[51] Int. Cl.² .............................................. H05B 5/04
[52] U.S. Cl. .......................... 219/10.77; 219/10.49 R; 323/24; 363/135; 363/96; 307/252 T
[58] Field of Search ............... 219/10.77, 10.49, 10.75; 363/135, 96; 323/24, 18; 307/252 M, 252 T

[56] References Cited

U.S. PATENT DOCUMENTS

| | | | |
|---|---|---|---|
| 3,805,141 | 4/1974 | Pompa, Jr. et al. | 363/135 |
| 3,821,509 | 6/1974 | Amagami et al. | 219/10.77 |
| 4,016,391 | 4/1977 | Kiuchi et al. | 219/10.77 X |
| 4,016,392 | 4/1977 | Kobayashi et al. | 219/10.77 X |
| 4,074,101 | 2/1978 | Kiuchi et al. | 219/10.77 X |
| 4,147,910 | 4/1979 | Kiuchi et al. | 219/10.49 R |

*Primary Examiner*—Thomas J. Kozma
*Assistant Examiner*—Philip H. Leung

*Attorney, Agent, or Firm*—Lowe, King, Price & Becker

[57] ABSTRACT

An induction heating apparatus includes a pair of thyristors inversely parallel connected to receive power from a low frequency energy source, a commutating circuit and a gating control circuit for supplying control pulses to the thyristors to produce a forward halfwave current through the commutating circuit which in return produces a backward commutating current to the thyristors. The gating control circuit includes a pulse transformer having a pair of secondary windings connected to the thyristors and a primary winding responsive to control pulses supplied from a pulse generator to produce a positive gating pulse in each of the secondary windings to drive one of the thyristors into conduction depending on the polarity of the source voltage to produce the forward current. The control pulse has a longer duration than the maximum duration of the forward halfwave current so that upon cessation of the forward current the other thyristor is gated into conduction to allow the backward commutating current to pass therethrough to complete an oscillation cycle. A counterelectromotive force is generated in the secondary windings in response to the trailing edge of the positive gating pulse to negatively bias the thyristor to quickly turn it off.

8 Claims, 4 Drawing Figures

INDUCTION HEATING APPARATUS

BACKGROUND OF THE INVENTION

The present invention relates generally to induction heating and in particular to an induction heating apparatus of the type having a pair of inversely parallel connected thyristors wherein a transformer is employed for simultaneous application of gating control pulses to the thyristors.

In induction heating systems wherein a pair of inversely parallel connected thyristors is employed as a switching element, the thyristors are gated alternately into conduction to convert low frequency energy into high frequency energy. Although the use of a pair of thyristors is advantageous in terms of economy over induction heating systems in which a thyristor and a feedback diode are employed as a switching element in combination with a heavy duty fullwave rectifier, the prior art control circuit is provided with a sequence control function to enable the thyristors to be alternately fired in succession depending upon the polarity of the input power source. However, such sequence control adds complexity to the system with a resultant increase in cost. Furthermore, to ensure safe gating operation, it is advantageous to quickly turn off a conducting thyristor as soon as the other thyristor is driven into conduction by application of a negative bias to the control gate of the thyristors. The aforesaid functions have been realized at the expense of increased costs which have impeded the widespread use of induction heating systems for household applications.

SUMMARY OF THE INVENTION

A principal object of the present invention is to provide a low cost induction heating apparatus capable of operating safely under various loading conditions.

Another object of the invention is to provide an induction heating apparatus particularly for cooking applications wherein a pulse transformer is employed for the purposes of simultaneously applying a positive gating control pulse and utilizing a counterelectromotive force generated in response to the trailing edge of the control pulse as a negative bias to turn off the conducting thyristors.

In accordance with the invention, pulse transformer has a pair of secondary windings connected to gate electrodes of a pair of inversely connected parallel thyristors and a primary winding responsive to control pulse generated by a pulse source. A positive gating pulse is simultaneously derived in each of the secondary windings and applied to the gate electrodes in response to a control pulse applied to the primary. In response to a control pulse being applied to the primary, the anode cathode path of one of the thyristors, which is positively biased by potential supplied from a low frequency energy source, is gated into conduction to generate a forward halfwave current which is supplied to a commutation circuit, the latter responding to the forward halfwave current by supplying backward commutating halfwave current to the other thyristor to complete an oscillation cycle. The positive gating pulse has a duration which is slightly longer than the duration of the forward halfwave current so that upon cessation of the forward current, the other thyristor is gated into conduction to pass the backward commutating current. Upon the termination of the positive gating pulse, there is produced in the secondary windings a counterelectromotive force which is supplied to the thyristors as a negative bias potential so that the conducting thyristor is quickly turned off.

Under no load conditions a loss of energy is encountered due to the passage of an abnormally large peak oscillating current through the thyristors. The invention further contemplates the use of a peak-to-peak detector for the purpose of limiting the positive to negative excursion of the oscillating current to within an effective range.

BRIEF DESCRIPTION OF THE DRAWINGS

The invention will be further described by way of example with reference to the drawings, in which.

DETAILED DESCRIPTION

Figure 1:
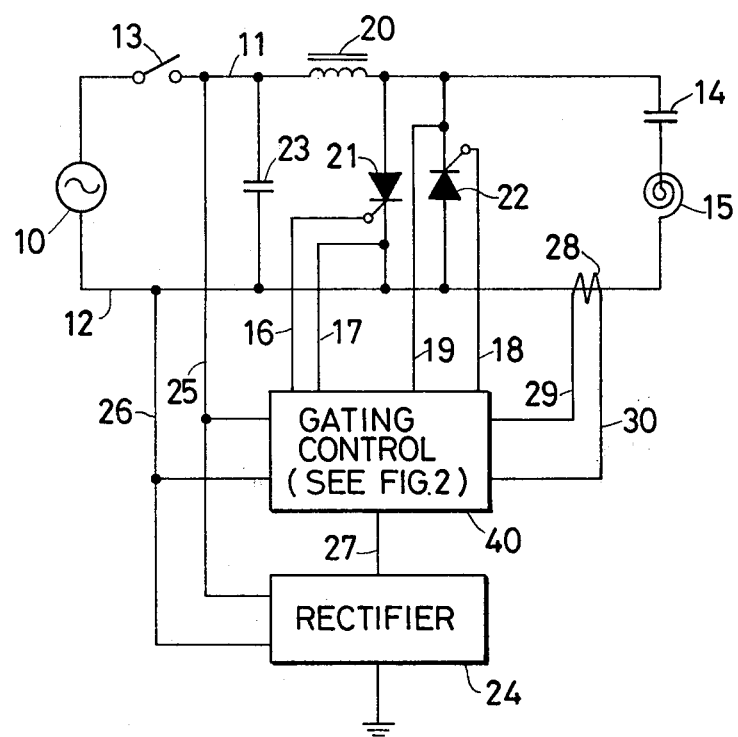
FIG. 1 is a functional block diagram of an induction heating apparatus embodying the invention.
Figure 2:
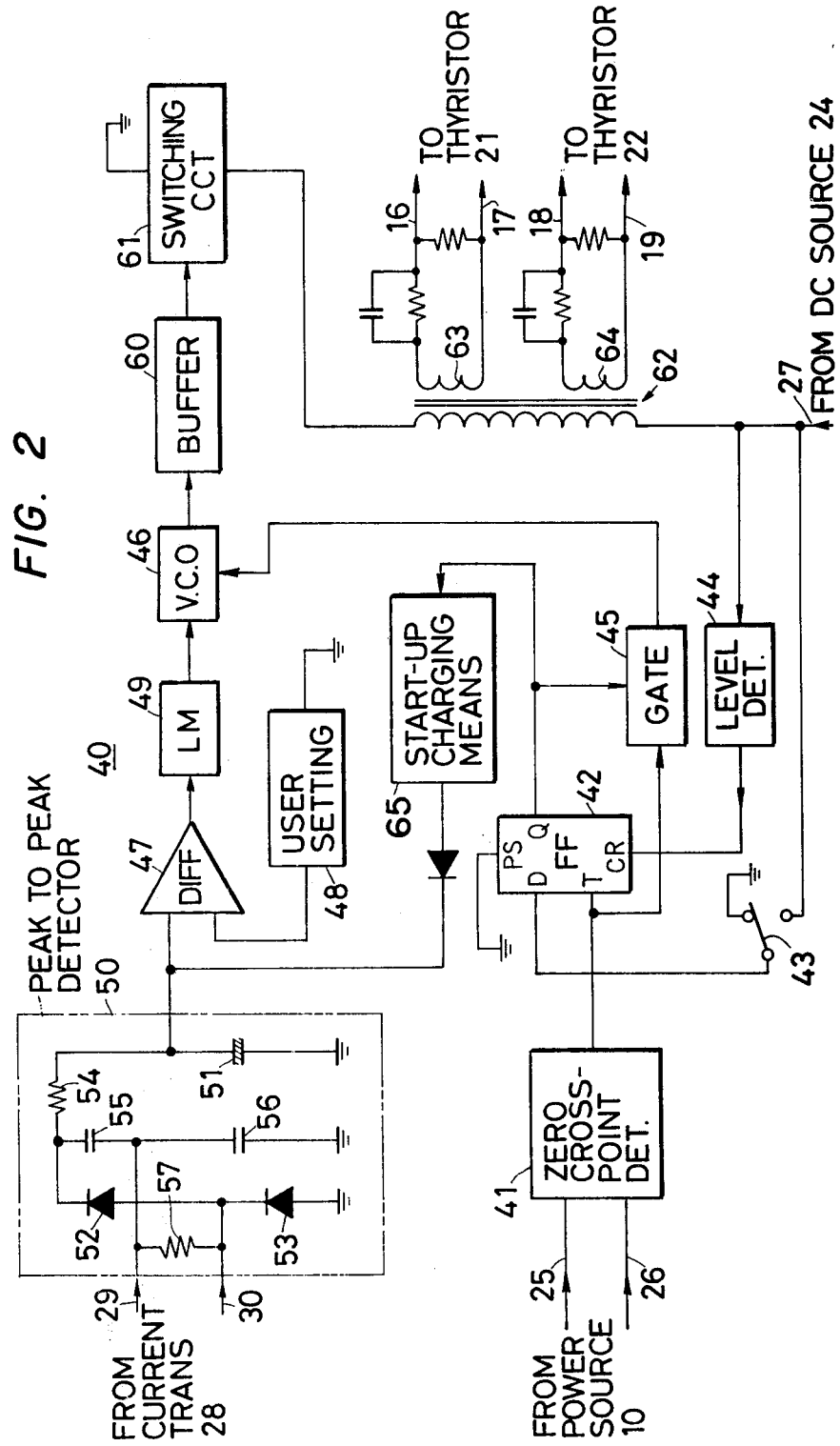
FIG. 2 is a circuit diagram of the thyristor gating control circuit constructed in accordance with the invention.

Referring now to FIG. 1, an induction heating apparatus embodying the present invention is illustrated. A relatively low frequency energy source 10 is connected to a bus line 11 through a normally open switch 13 and to a bus line 12. A pair of inversely parallel connected thyristors 21 and 22 is connected across the bus lines 11 and 12 to receive power from the energy source 10 through switch 13 to supply a forward current pulse to a commutation circuit 9 comprised by a commutating capacitor 14 and a commutating inductor or work coil 15. This commutation circuit 9 generates a high frequency current in cooperation with the thyristors 21, 22 by commutating a backward current to the thyristor pair at a frequency determined by the resonant frequency of the commutation circuit, which resonant frequency may vary in response to an inductive load to be heated by electromagnetic induction with the work coil 15. Specifically, the forward current pulse is generated when thyristor 21 is driven into conduction in response to a control pulse supplied from a gating control circuit 40 through leads 16, 17 provided the bus line 11 is positive with respect to the bus line 12. In accordance with the invention, the same control pulse is applied to the thyristor 22 through leads 18, 19. However, thyristor 22 remains nonconductive because it is reversely biased by the potential on the bus lines 11 and 12 until the backward commutating current from circuit 9 drives thyristor 22 into conduction, while at the same time turning the thyristor 21 out of conduction. This process is repeated by the application of successive control pulses from the control circuit 30 to generate high frequency current in the ultrasonic frequency range (18 kHz to 25 kHz) through the work coil 15. A filter inductor 20 is interposed in the bus line 11 to suppress the high frequency energy to avoid radio frequency interference, and a capacitor 23, connected across the bus lines 11 and 12, is to bypass the high frequency current which may pass through the inductor 20.

A DC power rectifier 24 is provided which receives power from the low frequency energy source 10 through leads 25, 26 to full-wave rectify the alternating voltage into a DC potential to energize the control circuit 40 through lead 27. In order to assure safe operation of the induction heating apparatus, the gating control circuit 40 is connected to the input power source through leads 25 and 26 to detect the instantaneous voltage level of the low frequency energy and to the commutating circuit 9 by means of a current transformer 28 through leads 29 and 30.

Referring to FIG. 9, there are illustrated the details of the gating control circuit 40 which includes a zero crosspoint detector 41 connected to the input power source 10 through leads 25, 26 to detect when the source voltage is at or near the zero voltage level to supply a trigger pulse to the trigger input terminal of a D flip-flop 42, having data input terminal D selectively connected through a switch 43 to ground. The switch 43 is ganged with the input switch 13 to couple ground to the data input D when the apparatus is not energized (when switch 13 is open) and couple a relatively high level voltage thereto from DC voltage source 24 in response to energization when switch 13 is closed.

A level detector 44 is coupled to the lead 27 to disable the flip-flop 42 until the DC voltage on lead 27 reaches a predetermined operating voltage level. To this end, level detector 44 derives a bi-level output having first and second voltages that are respectively derived in response to the voltage from source 24 being above and below the predetermined level. The bi-level output of detector 44 is applied to input CR of flip-flop 42, having a grounded PS input.

The flip-flop 42 is thus conditionally responsive to the input signals to the data and trigger terminals. If a zero voltage point of the input power source is detected by detector 41 and the data input D is switched to a high voltage level, the flip-flop 42 is switched to a high output state, which enables a gate 45 to pass the output pulse from the zero crossing detector 41 to a voltage-controlled oscillator 46. The pulse output of gate 45 inhibits oscillator 46 for a certain period of time to suspend gating operation to avoid misfiring.

A start-up charging circuit 65 is provided to supply a current to charge a capacitor 51 of a peak-to-peak detector 50 in response to the high voltage signal from the flip-flop 42 so that during the initial start-up period the capacitor 51 is charged up to a voltage which corresponds to a time interval sufficient to allow safe operation of the thyristors 21 and 22. The voltage across the capacitor 51 is coupled to an input of a differential amplifier 47 for comparison with a voltage supplied from a user setting circuit 48 which voltage represents the desired power level of the user. Since the initial value of the voltage across capacitor 51 is high, the output signal from the differential amplifier 47 is of a large amplitude which causes the voltage-controlled oscillator 46 to produce pulses of a relatively low frequency as to allow thyristors 21, 22 a sufficient time interval to generate a forward current and commute a backward current.

A limiter 49 is provided between the output of differential amplifier and the frequency control input of the voltage-controlled oscillator 46 to limit the amplitude of the input signal to the oscillator 46 to some predetermined threshold level which corresponds to a maximum gating interval at the start-up period.

The voltage-controlled oscillator 46 may be comprised by an integrated circuit IC463 555 timer which is basically an astable multivibrator configuration with a control terminal pin No. 6 connected to ground through a capacitor. In this instance, the output from the gate 45 is connected to the control pin No. 6.

Figure 3:
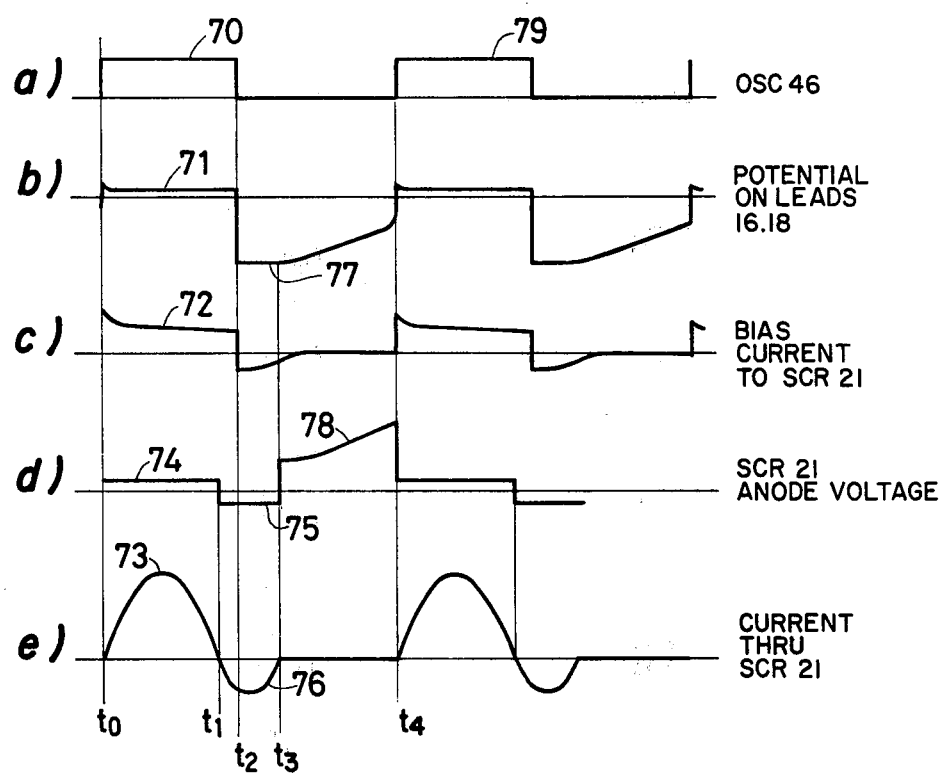
FIGS. 3a to 3e are a series of waveforms illustrating the timing relations between control pulses, negative bias potential and high frequency oscillatory current pulses.

The output of the voltage-controlled oscillator 46 is connected through a buffer amplifier 60 to the control electrode of a switching circuit 61 having a pair of power terminals connected in a series circuit with the primary winding of a pulse transformer 62 between the DC supply line 27 and ground. The transformer 62 includes a pair of secondary windings 63 and 64 connected respectively to the thyristors 21 and 22 through leads 16 to 19. In response to each pulse from the oscillator 46 the switching circuit 61 completes a circuit for the primary winding of transformer 62. The gating operation of the invention is best understood by reference to the waveforms illustrated in FIGS. 3a to 3e. FIG. 3a is an illustration of a waveform of the pulses generated by the oscillator 46. When the switching circuit 61 is driven into conduction in response to a control pulse 70, leads 16 and 18 are simultaneously positively biased with respect to leads 17 and 19, respectively, to a potential 71 (see FIG. 3b) so that the control gates of thyristors 21 and 22 are biased positive with respect to their cathodes. Assuming that the power line 11 is positive with respect to the line 12 while potential 71 is derived, a bias current 72 (FIG. 3c) flows into the control gate of thyristor 21 to gate it into conduction, thus generating a forward halfwave current 73 (see FIG. 3e) which flows into the commutation circuit 9. During the time interval from $t_0$ to $t_1$ in which the current pulse 73 subsists, the voltage across the anode and cathode of the thyristors 21 and 22 is at a low positive potential 74 (see FIG. 3d). The voltage across the anode and cathode of thyristors 21 and 22 switches to a low negative potential 75 at time $t_1$ whereupon a backward commutation current is supplied from the commutation circuit to the thyristors 21 and 22 so that thyristor 22 is driven into conduction at time $t_1$ and remains conductive until time $t_3$. The duration of the gating control pulse 70 is selected so that it terminates at time $t_2$ which is subsequent to time $t_1$. In response to the absence of the control pulse 70 at time $t_2$, the pulse transformer 62 generates an induced voltage 77 of negative polarity, or counterelectromotive force, in the secondary windings 63 and 64 so that the control gates of both thyristors are negatively biased with respect to their cathodes. This serves to clear off the residual carriers present in the thyristor 21 to permit it to quickly turn off. The application of the negative bias to the control gate of the now conducting thyristor 22 has no effect so that it remains in the conductive state to pass the backward commutating halfwave current pulse 76 therethrough. Since the negative potential 77 still subsists at time $t_3$, the thyristor 22 is also caused to quickly turn off by the negative bias at time $t_3$. The voltage across the anode and cathode of the thyristors 21 and 22 jumps to a certain relatively high positive voltage level 78 at time $t_3$. The voltage across the anode and cathode of thyristors 21 and 22 increases as a function of time until time $t_4$ when the next gating control pulse 79 occurs to repeat the above processes. During the time interval from $t_3$ to $t_4$ the negative bias potential 77 decreases at a rate determined by the semiconductive properties of the thyristors. In a practical embodiment, the maximum duration of the forward halfwave current pulse 73 during the interval $t_0$–$t_1$ is approximately 20 microseconds so that the pulse width of the gating pulse is selected have a value 3 to 5 microseconds longer than the maximum duration of the forward current pulse. It is to be understood therefore that the simultaneous application of gating control pulse 73 to the control gates of both thyristors 21,22 by use of pulse transformer 62 eliminates the need for a complex sequence circuit which distributes the control pulse to the control gate of the associated thyristor. Furthermore, the use of the pulse transformer 62 permits application of a negative bias potential to quickly turn off the previously conducting thyristor 21,22 so that the dv/dt capability of the thyristors is improved without having a snubber circuit which is employed in the prior art apparatus. Therefore, the thyristors 21,22 can be triggered successively into conduction at a high repetition frequency.

The high frequency energization current (FIGS. 4a and 4b) so generated in a manner as described above is sensed by the current transformer 28 and applied to the peak-to-peak detector 50 to detect the positive and negative peak values of the oscillatory current for the purposes of deriving a voltage signal representing the positive to negative excursion of the oscillatory current. This peak-to-peak detector is comprised by a pair of diodes 52 and 53 connected in a series circuit through resistor 54 and storage capacitor 51 with the junction between diodes 52, 53 being connected to the input lead 30, and a pair of series-connected capacitors 55 and 56 coupled across the diodes 52, 53 with the junction therebetween connected to the input lead 29. A resistor 57 is connected across the input leads 29, 30 to develop a voltage corresponding to the sensed peak-to-peak current level. These circuit elements of the detector 50 are so arranged in a circuit configuration known as a voltage doubler rectifier so that the operation of the detector 50 is well known to those skilled in the art and further description thereof is unnecessary.

Figure 4:
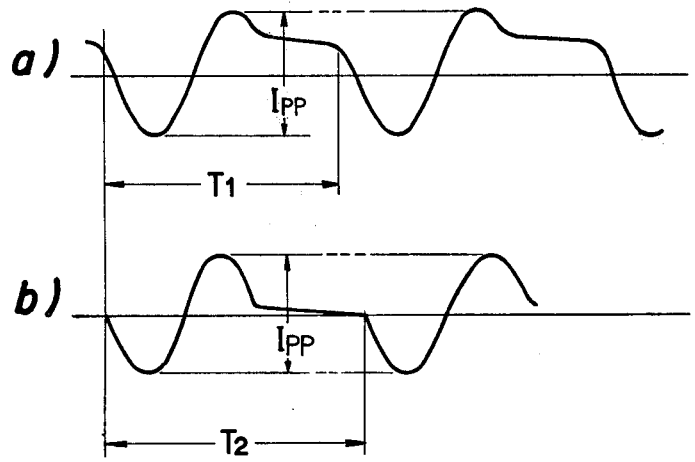
FIGS. 4a and 4b are waveforms of the oscillatory currents useful for understanding the operation of a peak-to-peak detector in a feedback control loop.

The voltage developed across the storage capacitor 51 is thus representative of the positive to negative peak excursion of the high frequency energization current (FIGS. 4a and 4b) which energizes the work coil 15. The output signal from the differential amplifier 47 is thus an indication of the deviation of the total energy delivered to the load or cooking wave from the user's setting power level. The deviation signal is fed into the voltage-controlled oscillator 46 to vary its frequency so that the apparatus of the invention operates as a feedback control loop to control the total output power of the apparatus to correspond to the user setting level. FIGS. 4a and 4b are respectively illustrations of the waveform of the high frequency energization current when the work coil 15 is inductively coupled with a cooking ware (loaded condition), and a similar waveform under no load condition. As illustrated in FIGS. 4a and 4b, the peak-to-peak value $I_{pp}$ is held constant regardless of whether there is a load or not, while the oscillating cycle has a longer duration $T_1$ under loaded condition than $T_2$ under no load conditions. Therefore, the peak-to-peak detection under feedback control operation has a limiting effect on the maximum peak value of the current passing through the thyristors so that there is no waste of energy due to an abnormally high peak current which would otherwise occur during no load conditions.

What is claimed is:

1. An induction heating apparatus comprising a pair of gate-controlled semiconductor switching devices connected in inverse parallel relationship to each other to receive power from a source of low frequency energy, a commutation circuit including a capacitor and a work coil, a pulse generator for generating a train of control pulses at a high frequency in the ultrasonic frequency range for successively driving one of said switching devices into conduction depending on the polarity of said low frequency energy to supply a forward halfwave current in response to each conduction of said switching devices to said commutation circuit to permit same to generate a backward halfwave commutating current through the other switching device to thereby generate a high frequency alternating current in said work coil, each of said control pulses having a duration longer than the maximum duration of said forward current, and a pulse transformer having a pair of secondary windings connected to said switching devices respectively and a primary winding responsive to said control pulse to generate an induced voltage in each of said secondary windings, whereby the control gates of said switching devices are simultaneously supplied with a positive pulse of the same duration as said control pulse and are simultaneously supplied with a negative bias potential in response to the trailing edge of said control pulse.

2. An induction heating apparatus as claimed in claim 1, wherein said control pulse has a duration smaller than the minimum duration of the cycle of said high frequency alternating current.

3. An induction heating apparatus as claimed in claim 1 or 2, further comprising a switching circuit responsive to said control pulse to complete a circuit for said primary winding of said transformer between a first and a second terminal of a DC voltage source.

4. An induction heating apparatus as claimed in claim 1, further comprising means for sensing said high frequency alternating current, a peak-to-peak detector connected to said sensing means for developing a voltage signal representative of the positive to negative peak values of said high frequency alternating current, and means for comprising said voltage signal with a reference value to generate a signal representing the deviation of said voltage signal from said reference value, and wherein said pulse generator comprises a variable frequency oscillator responsive to said deviation representative signal for generating a train of pulses of which the frequency is variable in accordance with said deviation representative signal.

5. An induction heating apparatus as claimed in claim 4, wherein said peak-to-peak detector comprises a voltage doubler rectifier.

6. An induction heating apparatus as claimed in claim 4 or 5, wherein said peak-to-peak detector comprises a storage capacitor to develop a voltage representing the positive to negative peak values of said high frequency alternating current, further comprising means for charging said storage capacitor in response to energization of said apparatus during a start-up period to a voltage level corresponding to a time interval which assures safe operation of said semiconductor switching devices.

7. An induction heating apparatus as claimed in claim 6, further comprising a manually operated switch for energization of said apparatus, means for detecting a zero voltage crosspoint of said low frequency energy source, gating means responsive to the simultaneous occurrences of the sensed zero voltage crosspoint and the operation of said switch to cause said charging means to permit charging of said storage capacitor.

8. An induction heating apparatus as claimed in claim 7, further comprising means for inhibiting said variable frequency oscillator for a certain period in response to the simultaneous occurrences of the sensed zero crosspoint and the output of the first-mentioned gating means.

* * * * *